(12) United States Patent
Li et al.

(10) Patent No.: US 7,120,215 B2
(45) Date of Patent: Oct. 10, 2006

(54) APPARATUS AND METHOD FOR ON-CHIP JITTER MEASUREMENT

(75) Inventors: Ken-Ming Li, Santa Clara, CA (US); Yun-Hsiang (Chris) Tsao, Sunnyvale, CA (US)

(73) Assignee: VIA Technologies, Inc., (TW)

( * ) Notice: Subject to any disclaimer, the term of this patent is extended or adjusted under 35 U.S.C. 154(b) by 655 days.

(21) Appl. No.: 10/017,160

(22) Filed: Dec. 12, 2001

(65) Prior Publication Data
US 2003/0108137 A1    Jun. 12, 2003

(51) Int. Cl.
*H04L 7/00*    (2006.01)
(52) U.S. Cl. .................................. 375/371; 375/372
(58) Field of Classification Search ............... 375/371, 375/354, 356, 224, 226
See application file for complete search history.

(56) References Cited

U.S. PATENT DOCUMENTS

| | | | | |
|---|---|---|---|---|
| 4,443,766 A | * | 4/1984 | Belton, Jr. | 327/91 |
| 4,713,621 A | * | 12/1987 | Nakamura et al. | 327/152 |
| 5,272,390 A | * | 12/1993 | Watson et al. | 327/141 |
| 5,272,729 A | * | 12/1993 | Bechade et al. | 375/371 |
| 5,289,135 A | * | 2/1994 | Hoshino et al. | 327/3 |
| 5,457,719 A | * | 10/1995 | Guo et al. | 375/373 |
| 5,708,382 A | * | 1/1998 | Park | 327/277 |
| 5,761,254 A | * | 6/1998 | Behrin | 375/355 |
| 5,900,834 A | * | 5/1999 | Kubinec | 342/115 |
| 6,304,116 B1 | * | 10/2001 | Yoon et al. | 327/158 |
| 6,795,515 B1 | * | 9/2004 | Riedle et al. | 375/355 |

\* cited by examiner

*Primary Examiner*—Chieh M. Fan
*Assistant Examiner*—Jason M. Perilla
(74) *Attorney, Agent, or Firm*—Anthony B. Diepenbrock, III; Dechert LLP

(57) ABSTRACT

A jitter measurement circuit is described comprising delay elements arranged in a serially-connected chain, and first and second sets of circuitry. Each delay elements has an associated delay, an input and an output that produces a delayed version of the signal at the input. The first set of circuitry is configured to detect propagation of the significant instant of the input clock signal through each of the delay elements and produces a pulse in response thereto. The width of the pulse is approximately equal to the delay of the corresponding delay element. The second set of circuitry has one storage element corresponding to each output of the first set of circuitry, for receiving a trigger signal that is timed to correspond to a delay which is approximately half of the total delay of the chain, and for recording in the corresponding storage element any pulse that is active at the time of occurrence of the trigger signal. Thus, a jitter measurement is made based on the pulses recorded in the storage elements after a plurality of trigger signals has occurred.

51 Claims, 6 Drawing Sheets

APPARATUS AND METHOD FOR ON-CHIP JITTER MEASUREMENT

FIELD OF THE INVENTION

The present invention relates to the field of integrated circuits. More particularly, the present invention relates to a circuit for measuring and correcting for jitter in a clock signal.

BACKGROUND OF THE INVENTION

Continuous advances in the fields of digital and analog circuits (i.e., microprocessors and high-speed communications,) require very high levels of performance from their many constituent components. Of extremely high importance, is the integrity of their clock signals within these high performance circuits. System clock performance that was previously acceptable is now insufficient to support the high clock speeds of today's circuits.

In developing an analog or digital circuit, a reference clock signal is typically generated either externally from or internally within a circuit. Such a reference clock signal is then directed to various circuits or sub-circuits in order to provide clocked operations. Certain performance is required of a reference clock signal and is specified by a designer in order to provide optimal operation of a circuit. The reference clock signal, in propagating through many circuits and sub-circuits, can be subjected to noise, including externally and internally generated electromagnetic interference (EMI) and radio frequency interference (RFI) noise. Moreover, rising and falling edges of a reference clock signal can deteriorate as they propagate through circuits and sub-circuits. As a clock signal propagates through circuits and sub-circuits, the clock signal becomes delayed and, therefore, lags the reference clock signal.

As mentioned, specifications are placed on a reference clock signal, however, clock signals received at a given point must also meet certain specifications that account for a certain amount of degradation while still allowing for an operational circuit. One of the specifications placed on a clock signal is a maximum allowable jitter. Jitter can be understood as short-term variations of the significant instants of a digital signal from their ideal positions in time. Significant instants include, for example, rising and falling edges of a square wave clock signal. Short term variations of these edges can be measured in time. For example, where a rising edge is expected to occur at time $E(t)$, but instead occurs a time t1 after $E(t)$, the rising edge is said to be delayed by a time $\Delta t1$ $(=t1-E(t))$. Where the rising edge instead occurs at a time t1 before $E(t)$, the rising edge is said to lead by a time $\Delta t$ $(=E(t)-t1)$. Similar measurements could be made for a falling edge of a clock signal or other significant instant on a clock signal. Jitter can also be measured in unit intervals and phase (or degrees). With regard to unit intervals, a single unit interval is one cycle of clock signal that is normalized to the clock period such that jitter expressed in unit intervals provides a measure for the magnitude of the jitter as a fraction of one unit interval. Jitter expressed in phase describes a measured clock signal with regard to a phase offset from a reference clock or an expected clock occurrence. One of skill in the art will understand that there exist other measures of jitter. It is therefore an object to the invention.

In measuring jitter, prior art methods have used an external oscilloscope connected to an integrated circuit. Preferred prior art methods use a digitizing oscilloscope to record and view a reference clock signal and an input clock signal simultaneously. While viewing these signals, a user is then able to compare the difference in time of these signals. The user can repeat this method many times to get an idea of how significant instants on an input clock signal vary over time and thus, the process is very time consuming. This prior art method is very cumbersome in that a large and expensive oscilloscope is required. Moreover, this prior art method is typically used in a lab environment and does not lend itself to use at other locations where a failing integrated circuit may be located.

SUMMARY OF THE INVENTION

Accordingly, it is an object of the invention to provide small yet efficient circuit and method for measuring the jitter of an input clock signal within an integrated circuit. Furthermore, it is an object of the invention to provide a circuit for measuring jitter within the integrated circuit itself. It is further an object of the invention to record jitter measurements for multiple occurrences of significant instants on the input clock signal. Moreover, it is an object of the invention to provide a feedback control system using the jitter measurements as feedback.

These and other objective are achieved in the present invention by providing an integrated circuit with an on-chip jitter measurement circuit. The on-chip jitter measurement circuit comprises a plurality of delay elements, a first set of circuitry and a second set of circuitry. The delay elements each have an associated delay, an input configured to receive an input clock signal and an output responsive to the associated delay and input clock signal. The input clock signal has a significant instant. The first set of circuitry is connected to the inputs and outputs of the plurality of delay elements. Moreover, the first set of circuitry is also configured to detect the significant instant of the input clock signal. The first set of circuitry is also configured to output a signal responsive to the significant instant of the input clock signal. The second set of circuitry is configured to receive the signal responsive to the significant instant of the input clock signal and a first trigger signal. Also, the second set of circuitry is configured to latch onto the signal responsive to the significant instant of the input clock signal and is further responsive to a significant instant of the first trigger signal. A measure for jitter is determined from the latched signal responsive to the significant instant of the input clock signal.

In another embodiment of the invention, the latched signal is filtered. In yet another embodiment, latched signal is recorded for a plurality of significant instants of the first trigger signal. In another embodiment of the invention, a result calculator is configured to provide information collected from the measure of jitter.

A method is also disclosed for measuring jitter of a significant instant of an input clock signal derived from a reference clock signal. The method comprises the steps of receiving an input clock signal, delaying the input clock signal, receiving a trigger signal and producing a jitter measurement signal. The input clock signal has a significant instant. The input the input clock signal is delayed by a first delay to produce a delayed clock signal and a delayed significant instant on the delayed input clock signal. The trigger signal is delayed from the reference clock signal by a second delay. The jitter measurement signal is responsive to the delayed significant instant of the delayed input clock signal and the trigger signal.

In another embodiment of the invention, a jitter measure is derived through a comparison of the jitter measurement signal to the first delay. In yet another embodiment of the invention, the jitter measurement signal is filtered to produce a filtered jitter measurement signal. In another embodiment of the invention, the jitter measurement signal is recorded for a first plurality of trigger signals. In yet another embodiment of the invention, certain items are adjusted in a feedback control manner responsive to the jitter measure.

Yet another embodiment of the invention is a system responsive to jitter in the system. The system comprises a reference clock, a plurality of circuits and a jitter measurement sub-system. The reference clock is configured to generate a reference clock signal having an associated frequency. The plurality of circuits is configured to receive the reference clock signal and is operative to generate an input clock signal. The plurality of circuits has a first set of characteristics. The jitter measurement sub-system is configured to receive the reference clock signal and the input clock signal and is operative to generate a jitter measurement output signal responsive to a significant instant of the input clock signal. Moreover, the jitter measurement sub-system includes a plurality of delay elements and at least one programmable delay element. The plurality of delay elements has a plurality of associated delays configured to generate a synthesized signal from the reference clock signal and the input clock signal. The at least one programmable delay element has at least one associated programmable delay configured to produce a trigger signal for generating the jitter measurement output signal from the synthesized signal. The system is operative to adjust at least one parameter of the system responsive to the jitter measurement output signal. In other embodiments of the invention, the at least one parameter includes characteristics or parameters of the reference clock, the plurality of circuits and the jitter measurement subsystem including the plurality of delay elements and the at least one programmable delay element.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

A. Illustration of Jitter

Figure 1:
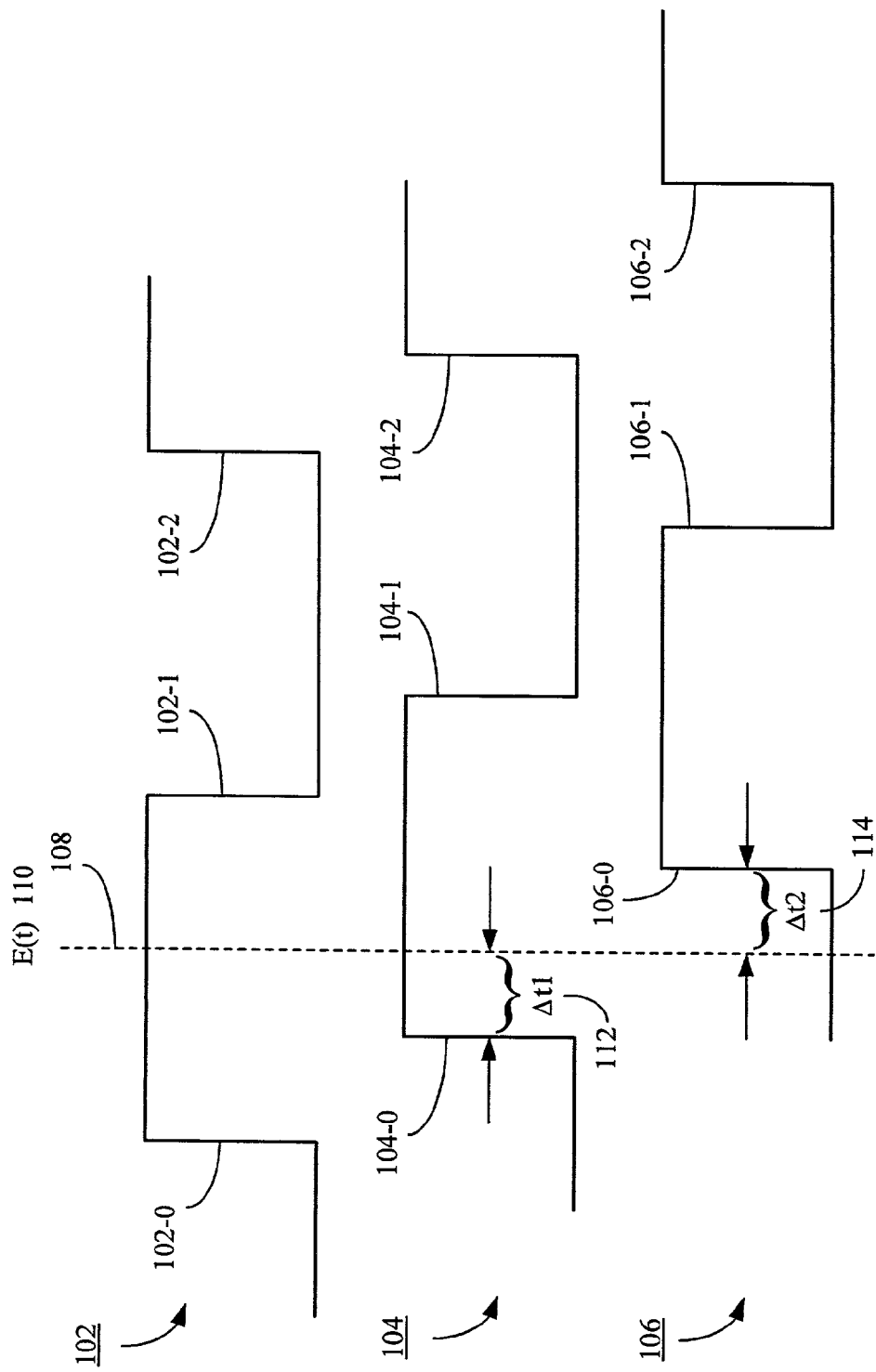
FIG. 1 is a timing diagram illustrating significant time instants of a reference clock signal and an input signal according to an embodiment of the invention.

Shown in FIG. 1 is a reference clock signal 102 and input clock signals 104 and 106. Reference clock signal 102 can be, for example and without limitation, a master clock signal generated externally from a microprocessor or can be an internally generated clock signal within an application specific integrated circuit (ASIC). Moreover, reference clock signal 102 can be derived from another clock signal. Input clock signals 104 and 106 can be, for example and without limitation, clock signals received at an input to a microprocessor or communication circuit. Significant instants of reference clock signal 102 include rising edges 102-0 and 102-2 (note that various occurrences of similar events are indexed as "-x") and the falling edges 102-1. As shown input clock signals 104 and 106 have corresponding significant instants shown as rising edges 104-0 and 106-0, respectively. Also shown is dashed line 108 corresponding to an expected time E(t) 110 corresponding to the time when the rising edges of input clock signals 104 and 106 is expected to occur. Deviations from the expected time E(t) 110 are considered jitter. As shown, rising edge 104-0 of input clock signal 104 occurs earlier in time than expected time E(t) 110. The difference in time is measured as $\Delta t1$ 112 and rising edge 104-0 is said to lead expected time E(t) 110. Moreover, rising edge 106-0 of input clock signal 106 occurs later in time than expected time E(t) 110. The difference in time is measured as $\Delta t2$ 114 and rising edge 106-0 is said to lag expected time E(t).

The measured time differences, $\Delta t1$ and $\Delta t2$, are a measure of jitter as discussed supra. One of skill in the art understands that a clock signal such as input clock signals 104 and 106 experiences variations in its significant instants due to noise and other causes. Moreover, one of skill in the art understands that an ability to measure jitter and especially an ability to measure jitter using on-chip components leads to optimizing of circuit and system performance. For example, clock frequency is controllable by increasing or decreasing its frequency. Where clock performance is observable, as provided by the present invention, the observability and controllability features can be combined to provide a feedback control system to optimize the performance of a circuit or system. This aspect of the invention will be discussed after first discussing the on-chip jitter measurement circuit of the present invention.

B. Jitter Measurement: Method and Block Diagram

Figure 2A:
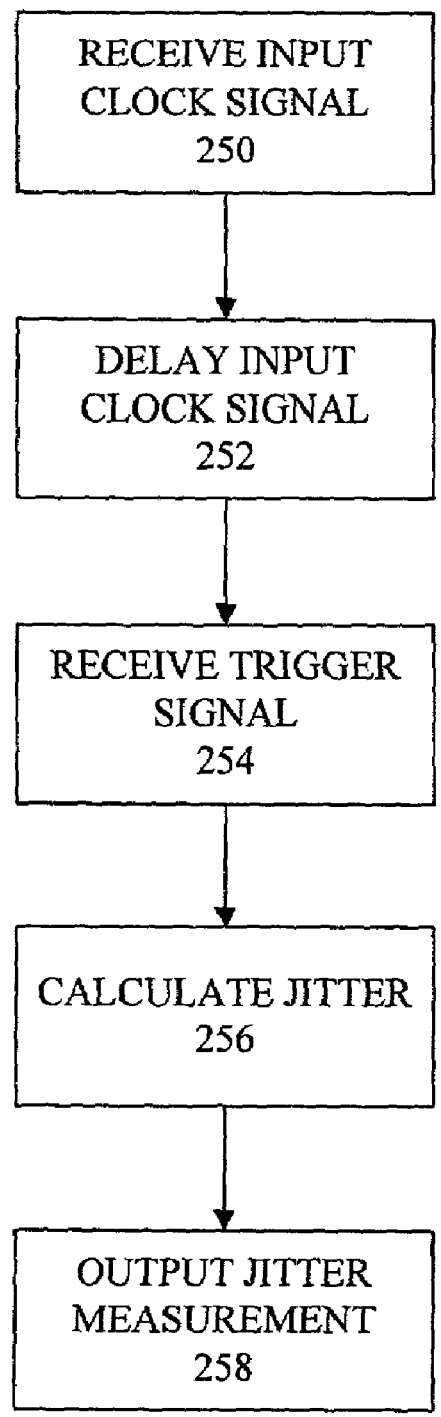
FIG. 2A is a flowchart of a method for measuring jitter according to an embodiment of the invention.
Figure 2B:
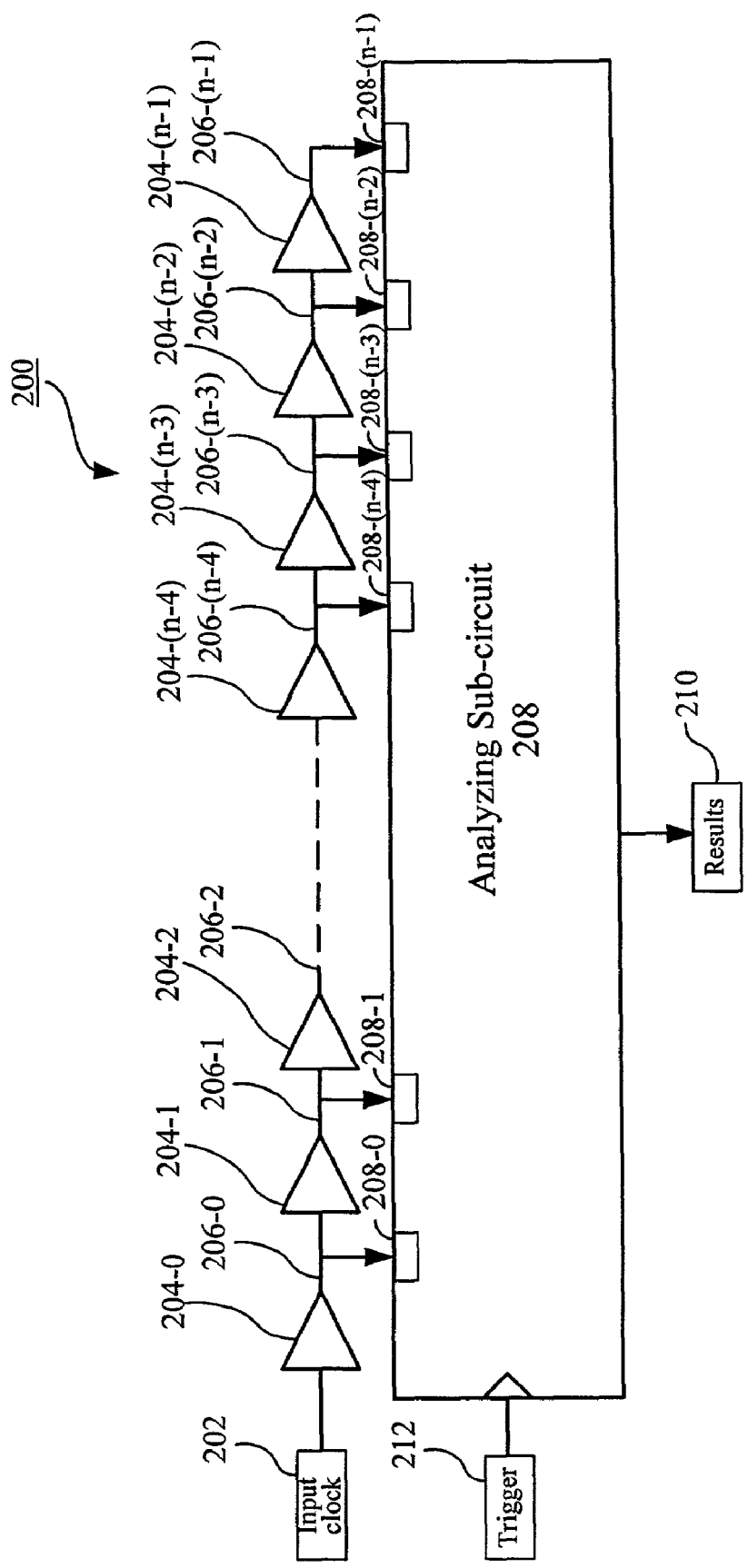
FIG. 2B is a block diagram of an analyzing circuit according to an embodiment of the invention.

With the understanding of jitter, a method of the present invention for measuring jitter can be understood as shown in the flowchart of FIG. 2A and the block diagram of FIG. 2B. In receiving an input clock signal at step 250 of FIG. 2A, the input clock signal is delayed at step 252 by a predetermined amount. This predetermined amount can be related to an expected amount of delay due to a clock signal propagating through circuits and sub-circuits. A trigger signal is provided as step 254 that is related to an instant in time when a significant instant of the delayed input clock signal is expected to occur. Jitter measured as the difference in time, $\Delta t$, between the occurrence of a significant time instant of the delayed input clock signal and the trigger signal, is calculated at step 256. The calculated jitter result is then output at step 258.

FIG. 2B is a block diagram of analyzing circuit 200 for implementing the method of FIG. 2A. Moreover, analyzing circuit 200 implements further enhancements that implement the method of FIG. 3B and will be described infra. Input clock signal 202 as shown in FIG. 2B is provided to a plurality of delay elements 204-0 through 204-(n−1). Providing the input clock signal 202 to analyzing circuit 200 corresponds to step 250 (of FIG. 2A) and the input clock signal as it propagates through delay elements 204-0 through 204-(n−1) corresponds to step 252. For purposes of illustration, consider that a rising edge is the significant instant of interest here. Further, consider that all delay elements 204-0 through 204-(n–1) are at steady state with all delay element outputs 206-0 through 206-(n–1) at logic level low. As the leading edge propagates through delay elements 204-0 through 204-(n–1), the outputs 206-0 through 206-(n–1) transition from a logic level low to a logic level high. For example, where input clock signal 202 has propagated through delay element 204-0 but has not yet propagated through 204-1, a logic level high will be present on output signal 206-0 and a logic level low will be present at output signal 206-1. How far input clock signal 202 has propagated through delay elements 204-0 through 204-(n–1) can, therefore, be determined by monitoring all output signals 206-0 through 206-(n–1). Signals 206-0 through 206-(n–1) are provided to inputs 208-0 through 208-(n–1) of analyzing sub-circuit 208. Analyzing sub-circuit 208 provides the function of monitoring output signals 206-0 through 206-(n–1). Analyzing sub-circuit 208 further receives a trigger signal 212 that is related to an instant in time when a significant instant on the delayed input clock signal is expected to occur. Receiving of trigger signal 212 by analyzing sub-circuit 208 corresponds to step 254 of FIG. 2A. Upon receipt of trigger signal 212, analyzing sub-circuit 208 calculates the difference between the occurrence of a significant time instant on the delayed input clock signal and the trigger signal corresponding to step 256 of FIG. 2A.

Returning to the example where input clock signal 202 has propagated through delay element 204-0, but not through delay element 204-1, were trigger signal 212 to occur at this time, analyzing sub-circuit 208 would receive a logic level high at input 208-0 and a logic level low at input 208-1. With information of when the rising edge of input clock signal should occur, analyzing sub-circuit 208 is configured to expect input clock signal 202 to have propagated through a predetermined number of delay elements 204-x. In an exemplary embodiment of the invention, analyzing circuit 200 is configured to expect input clock signal to have propagated through half of the delay elements, n/2. Note that n/2 is used in this embodiment because n is implemented as a power of 2 and is therefore divisible by 2. Where n/2 is not an integer, the next highest or lowest integer can be used. With this information of where a significant instant is expected to occur, analyzing sub-circuit 208 is then able to calculate a difference in time, Δt, between when the rising edge was expected to occur and when it actually occurred. This result or a related result is then output as result 210 corresponding to step 258 of FIG. 2A.

C. On-Chip Jitter Measurement Circuit

Figure 3A:
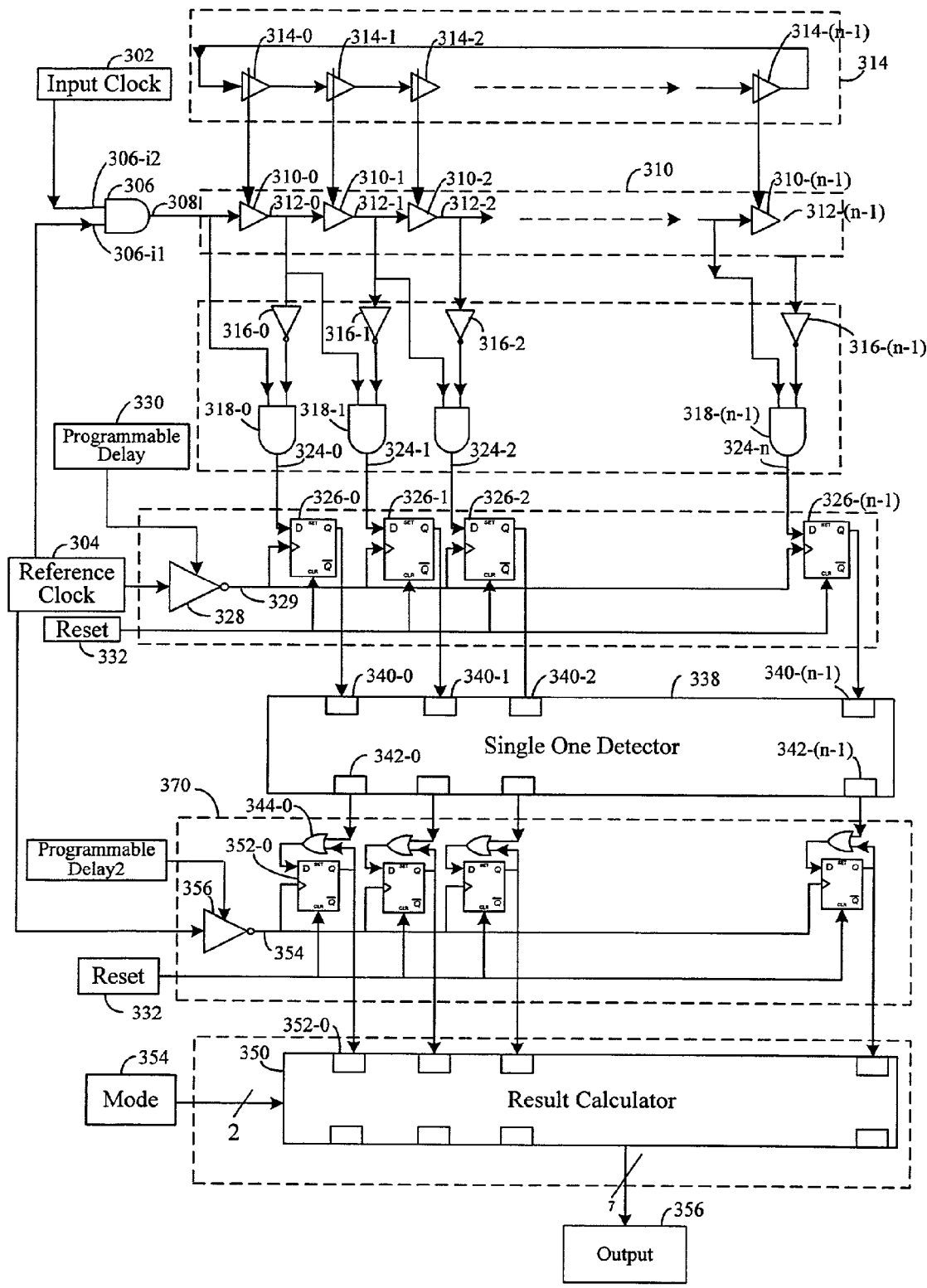
FIG. 3A is a schematic diagram of an on-chip jitter measurement circuit according to an embodiment of the invention.

With an understanding of the method of the present invention and a general implementation, we now turn to a specific embodiment of the invention using logic elements known in the art. Shown in FIG. 3A is a jitter measurement circuit 300 with a reference clock signal 304 and input clock signal 302 input to an AND gate 306 through inputs 306-i1 and 306-i2, respectively. Jitter measurement circuit 300 is configured to measure jitter at the rising edge of input clock signal 302, however, one of skill in the art with an understanding to be gained from jitter measurement circuit 300 will understand how to modify the teachings of the invention to measure other significant instants of an input clock signal such as the falling edge of input clock signal 302. In the embodiment shown, reference clock signal 304 is a master clock signal and input clock signal 302 is a clock signal that has propagated through a plurality of circuits and sub-circuits such that input clock signal 302 always lags reference clock signal 304. One of skill in the art will understand that input clock signal 302 and reference clock signal 304 may by related in different manners such that one will not always lead or lag the other.

Continuing with the embodiment shown in FIG. 3A, because input clock signal 302 is expected to always lag reference clock signal 304 and because the rising edge is the significant instant of input clock signal 302, upon the occurrence of the rising edge of input clock signal 302 reference clock signal is already expected to be at a logic level high. Thus, output 308 of AND gate 306 will become a logic level high when input clock signal 302 becomes high. In this way, output 308 is a signal synthesized from reference clock signal 304 and input clock signal 302. Note that AND gate 306 is chosen to have a low propagation delay as compared to delay elements 310-0 through 310-(n–1) yet to be described. The rising edge of output 308 of AND gate 306, therefore, closely corresponds to the rising edge of input clock signal 302. Output 308 of AND gate 306 is then input to a plurality of serially-connected delay elements 310-0 through 310-(n–1). Thus, input clock signal 302 propagates through delay elements 310-0 through 310-(n–1) to produce delay element outputs 312-0 through 312-(n–1). In an embodiment of the invention, delay elements 310-0 through 310-(n–1) are configured to have approximately equal associated delays. In another embodiment, the associated delay of delay elements 310-0 through 310-(n–1) is controlled by delay lock loop 314 which is in turn controlled by a charge pump as known to those of skill in the art. As shown in FIG. 3A, delay lock loop 314 has a plurality of charge pump elements 314-0 through 314-(n–1) that control the associated delay of delay elements 310-0 through 310-(n–1), respectively. Delay lock loop 314 and charge pump elements 314-0 through 314-(n–1) are shown as a particular embodiment, however, one of skill in the art understands that other delay elements are possible without deviating from the teachings of the invention. In another embodiment of the invention, the associated delay of delay elements 310-0 through 310-(n–1) are chosen such that the delay elements surrounding delay elements 310-(n/2) have a shorter associated delay than elements at the edges such as delay elements 310-0 and 310-(n–1). Such an embodiment is desirable where a significant instant is expected to occur centered about 310-(n/2) and is not expected to accur at the extremes. It has been observed that a significant instant of a clock signal is distributed as Gaussian distribution with an associated mean E(t) and standard deviation, σ. With knowledge of a Gaussian distribution, σ, a higher resolution is desirably centered about E(t); moreover, a high resolution is not necessary as a time deviates from the expected time of occurrence, E(t).

Recall that, in the embodiment being described, jitter measurement circuit 300 is configured to measure jitter at the rising edge of input clock signal 302. As the rising edge of input clock signal 302 propagates through delay elements 310-0 through 310-(n–1), their associated delay element outputs 312-0 through 312-(n–1) transition from logic level low to logic level high. For example, where input clock signal 302 has propagated through delay element 310-0 but not through delay element 310-1, delay element output 312-0 is logic level high and delay element output 312-1 is logic level low. This condition will be used as an exemplary condition for the purposes of further describing the operation of jitter measurement circuit 300. To further the understanding of jitter measurement circuit 300, ones (1s) and zeros (0s) are shown depicting the logic level of certain points on the circuit being described. So as not to clutter FIG. 3A, not all logic states are shown without detracting from an understanding of the circuit. In the condition being described, AND gate 318-1 is notable. AND gate 318-1 receives input from output signal 312-0 at logic level high and an inverted form of output signal 312-1 at logic level high. Output signal 312-1 is inverted by inverter 316-1 and the corresponding output signal is input to AND gate 318-1. Thus, AND gate 318-1 receives two logic level high inputs so as to provide AND gate output 324-1 as a logic level high. Contrastingly, every other AND gate 310-0 and 310-2 through 310-(n−1) will output a logic level low AND gate output 324-0 and 324-2 through 324-(n−1), respectively.

AND gate output signals 324-0 through 324-(n−1) are provided to each D input of D flip-flops 326-0 through 326-(n−1). Note that the D flip-flops used in jitter measurement circuit 300 each have a D input, a positive edge clock input, a clear input, a Q output and a Q_bar output. Other types of flip-flops or latches can be used while still remaining within the teachings of the invention. In the condition being described, note that all D inputs to D flip-flops 326-0 through 326-(n−1), except D flip-flop 326-1, receives a logic level low; D input to D flip-flop 326-1 receives a logic level high.

In the embodiment being described, jitter measurement circuit 300 is configured with an expectation that the rising edge of delayed input clock signal will occur centered about delay element 310-(n/2). Recall that a trigger signal 212 was described for analyzing circuit 200 of FIG. 2B. A similar signal is generated for jitter measurement circuit 300 of FIG. 3A. To do so, reference clock signal 304 is input to programmable delay element 328. Programmable delay element 328 further receives as input programmable delay set signal 330. Programmable delay set signal 330 sets the associated delay of programmable delay element 328. In the embodiment being described, the associated delay of programmable delay element 328 is set so that input signal 302 should, on average, propagate through n/2 delay elements of delay elements 310-0 through 310-(n−1). The output of programmable delay element 328 is, therefore, trigger signal 329, which is simultaneously input to the clock inputs of each D flip-flop 326-0 through 326-(n−1). With trigger signal 329, D inputs to D flip-flops 326-0 through 326-(n−1) are transferred to the Q outputs of D flip-flops 326-0 through 326-(n−1), respectively. In the condition being described, with a logic level high at the D input to D flip-flop 326-1, the associated Q output becomes logic level high. Similarly, Q outputs of D flip-flops 326-0 and 326-2 through 326-(n−1) become logic level low.

In this condition, jitter information is now available. For example, assume that delay elements 310-0 through 310-(n−1) each have an associated delay of 10 picoseconds (ps) and that n=128. Further assume that the rising edge of input clock signal is expected to be delayed by 640 ps. Accordingly, programmable delay element 328 is chosen to have a delay of 640 ps. In the condition being described, however, the rising edge is detected at the Q output of D flip-flop 326-1. The deviation from the expected time of the rising edge can, therefore, be calculated as follows: $\Delta t = [(128/2) - 2] \times 10 \text{ ps} = 620 \text{ ps}$. In this example, the actual time of the rising edge of input clock signal leads its expected time by 620 ps. This information can then be provided to other circuits or processors for further analysis and optimization. Optimization schemes will be described infra with reference to FIG. 4.

As shown in FIG. 3A, jitter measurement circuit 300 provides further enhancements to accommodate and correct for real-world situations. Single one detector 338 provides a filtering function to the Q outputs of D flip-flops 326-0 through 326-(n−1). In a particular embodiment, single one detector 338 is configured such that where only one input is at a logic level high, the corresponding output is also set to a logic level high. In another embodiment, single one detector 338 is configured such that if there are multiple inputs at logic level high, no outputs are set to logic level high. In yet another embodiment, single one detector 338 is configured such that if multiple inputs are at logic level high the correspondingly latest occurring signal is output from single one detector 338. And in yet another embodiment, where multiple inputs are at logic level high, the correspondingly earliest occurring signal is output from the single one detector 338. The filtering function of single one detector 338 is especially necessary in noisy conditions where several of D flip-flops 326-0 though 326-(n−1) may inadvertently become logic level high.

With the logic conditions being described, single one detector input 340-1 is at logic level high with all other inputs at logic level low. Accordingly, corresponding single one detector output 342-1 is set to logic level high with all other outputs set to logic level low. Single one detector outputs 342-0 through 342-(n−1) can be used to calculate lag or lead times as described supra.

FIG. 3A shows further enhancements to jitter measurement circuit 300. Using OR gates 344-0 through 344-(n−1), D flip-flops 352-0 through 352-(n−1) and programmable delay element 356, a multiple event recorder 370 sub-circuit is implemented. Multiple event recorder 370 captures information for multiple occurrences of rising edges. For example, it may be desirable to capture information for multiple (i.e., 100) occurrences of rising edges on input clock signal 302. The period for the multiple occurrences is set by reset signal 332. Where a period of 100 rising edges is chosen, reset signal 332 becomes logic level high upon every 100 rising edges to clear D flip-flops 352-0 through 352-(n−1).

With the conditions being described and assuming that a reset signal 332 had previously been provided such that all Q outputs to D flip-flops 352-0 through 352-(n−1) are logic level low, one input to OR gate 344-1 received from single one detector output 342-1 will be logic level high while the other input will be logic level low. Accordingly, the output of OR gate 344-1 will be logic level high and is input to the D input of D flip flop 352-1. Because all other single one detector outputs 342-0 and 342-2 through 342-(n−1) are logic level low as well as all other Q outputs of D flip-flops 352-0 and 352-2 through 352-(n−1), all corresponding OR gate 344-x inputs and D inputs of D flip-flops 352-x will be logic level low. Programmable delay element 356 operates similarly to programmable delay element 328 except that programmable delay element 356 is preferably delayed slightly longer than programmable delay element 328 so as to allow all signals to propagate through to at least D flip-flops 352-0 through 352-(n−1). Trigger signal 354 is, therefore, generated as a delayed version of reference clock signal 304. Upon the occurrence of the rising edge of trigger signal 354, D flip-flops 352-0 through 352-(n−1) transfer their logic information from their D input to their Q output. With the conditions being described, the Q output of D flip-flop 352-1 will become logic level high whereas all other Q outputs of flip-flops 352-0 and 352-2 through 352-(n−1) will become logic level low. An important feature here is that the Q output of D flip-flop 352-1 will remain at a logic level high until the occurrence of the next reset signal 332. With its Q output at a logic level high and being fed back to its D input through OR gate 344-1, the D input will continue to be a logic level high regardless of the single one detector output 342-1. Accordingly, the Q output of D flip-flop 352-1 will continue to be a logic level high. During another reference clock cycle where, for example, the Q output of D flip-flop 352-2 becomes logic level high, both 352-1 and 352-2 will continue to remain at a logic level high. In this manner, all rising edge occurrences of input clock signal 302 are recorded. Any logic level high occurring at the Q outputs of D flip-flops 352-0 through 352-(n−1) are set low only upon the occurrence of a reset signal 332.

The Q outputs of D flip-flops 352-0 through 352-(n−1) are provided as input to result calculator 350. In an embodiment of the invention, result calculator 350 calculates information for every cycle of reset signal 332 (i.e., 100 cycles of reference clock signal 304). Result calculator 350 can be configured to provide several modes of operation. For example, in a mode 0 of operation, result calculator 350, provides information on the earliest occurrence of the rising edge of input clock signal 302; in a mode 1 of operation, result calculator 350 provides information on the latest occurrence of the rising edge of input clock signal 302; and, in a mode 2 of operation, result calculator 350 provides information on the difference between the earliest and latest occurrences of the rising edge of input clock signal 302. Moreover, a mode 3 of operation provides median or average information of the occurrences of the rising edge of input clock signal 302. In an embodiment of the invention, the mode of operation is selected by a corresponding two-bit signal at mode input 354 and result information is output as result calculator output 356 as an eight-bit word. Note that mode input 354 and result calculator output 356 can have more or less bit lines as appropriate to convey logic level information and can be modified by one of skill in the art without deviating from the teachings of the invention.

One of skill in the art will appreciate that many enhancements are possible to the embodiments shown without deviating from the teachings of the invention. For example, counters can be implemented at the Q outputs of D flip-flops 352-0 through 352-(n−1) so as to be able to record multiple occurrences of a rising edge at approximately the same time. With such information being input to result calculator 350, averages and standard deviations could be provided as other modes of operation for result calculator 350. It is important to note that a hardware implementation of result calculator is shown in FIG. 3A, however, a software or firmware implementation would also be appropriate.

Figure 3B:
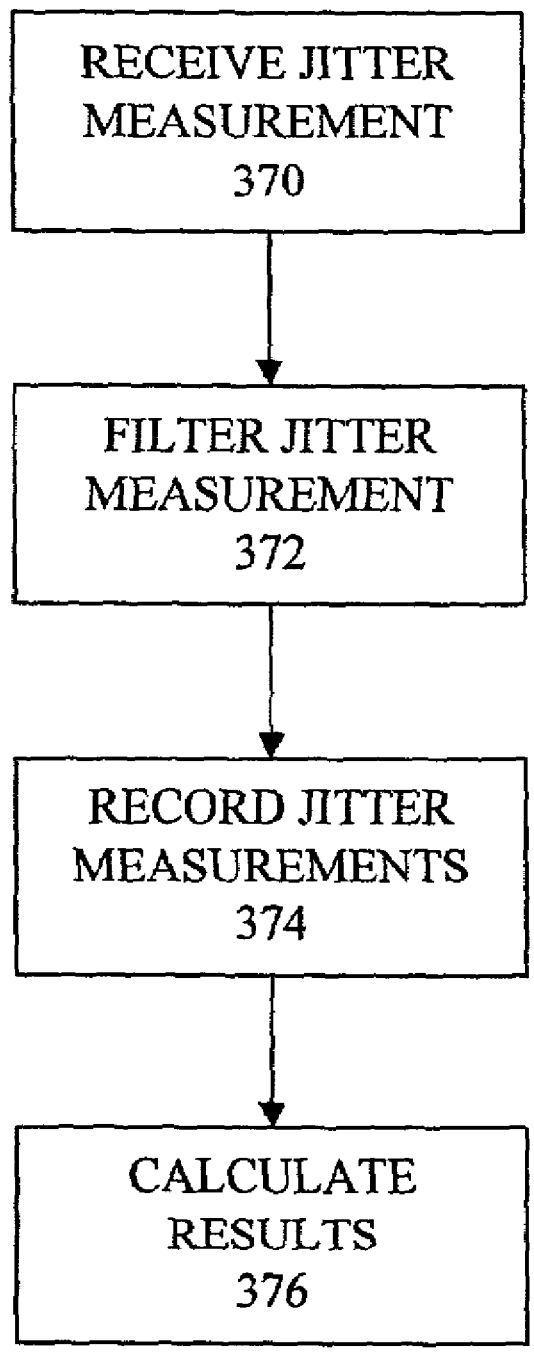
FIG. 3B is a flowchart illustrating the process of calculating jitter results according to an embodiment of the invention.

As described, jitter measurement circuit 300 implements the method of FIG. 2A and further implements the enhancements of the method of FIG. 3B. At step 370 of FIG. 3B, the jitter measurements generated at step 258 of FIG. 2A are received. Such jitter measurements are then filtered at step 372. As described supra, filtering can be accomplished by a single one detector 338 (FIG. 3A). Moreover, filtering can be achieved by other methods known in the art without deviating from the teachings of the invention. At step 374 of FIG. 3B, the filtered jitter measurements are recorded. As implemented for jitter measurement circuit 300 of FIG. 3A, the recording function is achieved by D flip-flops 352-0 through 352-(n−1) in conjunction with OR gates 344-0 through 344-(n−1) in feedback loops. Finally, at step 376 of FIG. 3B, jitter results are calculated. As discussed with reference to jitter measurement circuit 300 of FIG. 3A, jitter results can be in the form of the earliest or latest occurrence of the rising edge, median or average time of occurrence of the rising edge, or other statistical results.

D. Feedback Control Using Jitter Information

Figure 4:
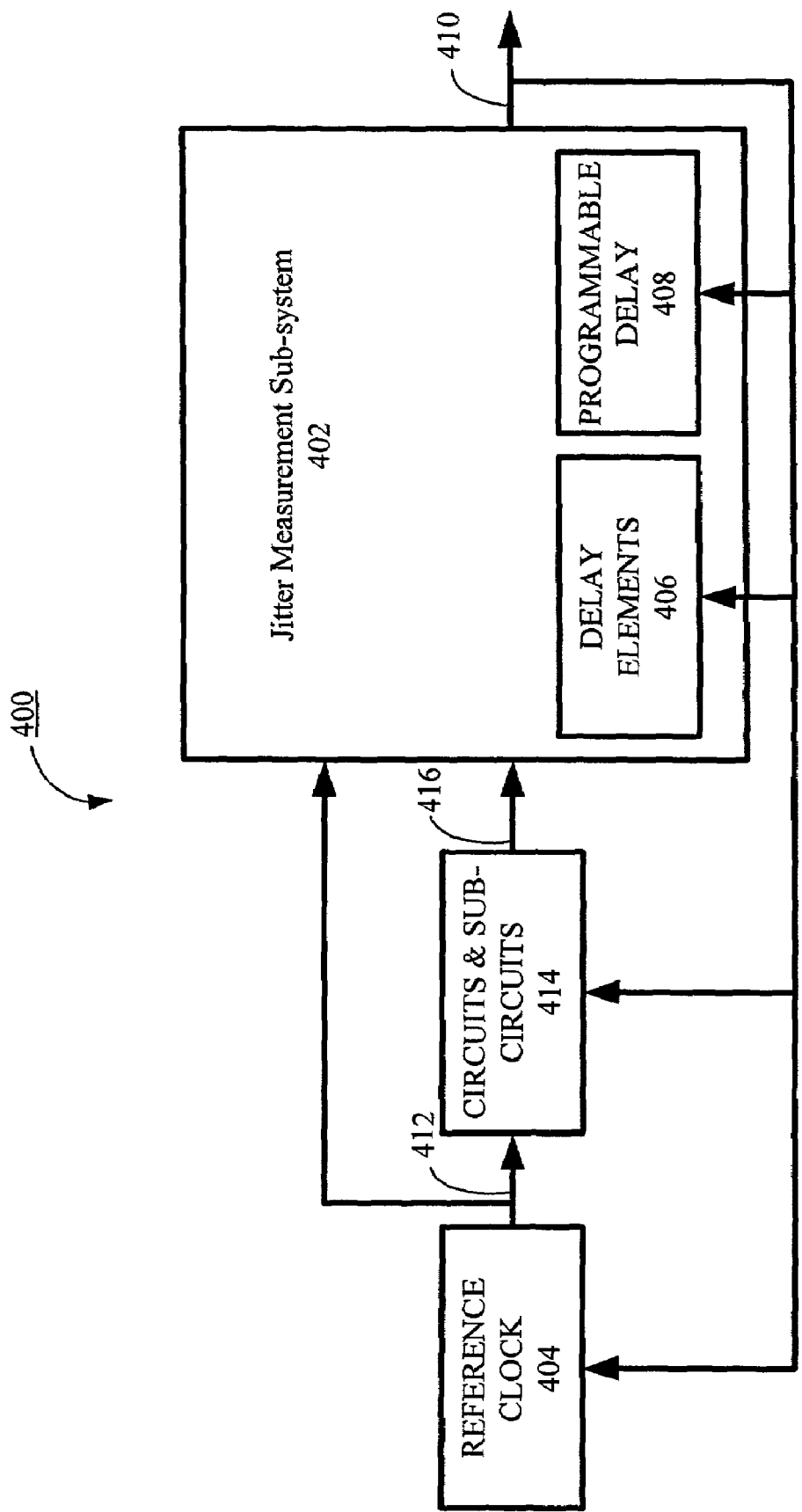
FIG. 4 is a block diagram of a feedback system for optimizing the operation of various components of a system implementing a clock generating circuit according to an embodiment of the invention.

Having the jitter information provided by the methods and implementations of the present invention allows for optimization of circuits and systems on which the present invention is implemented. FIG. 4 is a block diagram of feedback system 400 implementing jitter measurement sub-system 402. As shown, sub-system 402 implements the methods of FIGS. 2A and 3B and has within it delay elements 406 and at least one programmable delay element 408. Delay elements 406 are substantially similar as those described for delay elements 204-0 through 204-(n−1) and delay elements 314-0 through 314-(n−1). Programmable delay element 408 is substantially similar as programmable delay 328. Reference clock generator 404 is used to generate a reference clock signal 412 substantially similar as that described for reference clock signal 304. Reference clock signal 412 is input to analyzing circuit 200 as described for FIGS. 2A, 2B, and jitter measurement circuit 300 of FIGS. 3A and 3B; moreover, reference clock signal 412 is input to circuits and sub-circuits 414. Circuits and sub-circuits 414 can be, for example, the many circuits and sub-circuits within a computer or microprocessor. Among other things, input clock signal 416 is produced by circuits and sub-circuits 414 and input to jitter measurement sub-system analyzing circuit 402. Input clock signal 416 is substantially similar to input clock signal 202 and input clock signal 302 as described for FIGS. 2B and 3A. The constituent parts of FIG. 4 can be modified as described herein or as known to those of skill in the art.

Consistent with FIGS. 2A, 2B, 3A and 3B, jitter measurement sub-system 402 generates jitter results and calculations output 410. For the purposes of FIG. 4, jitter results and calculations output 410 can be a composite output with various types of information consistent with the teachings of the invention. Jitter results and calculations output 410 is then used in feedback configurations to optimize the performance of feedback system 400. Jitter results and calculations output 410 can be fed back to at least four components including reference clock generator 404, delay elements 406, programmable delay element 408, as well as, circuits and sub-circuits 414.

In feeding back jitter results and calculations output 410 to reference clock generator 404, reference clock generator can be adjusted for peak performance without risking system problems. For example, where jitter results and calculations output 410 reveals that the reference clock generator 404 is generating a reference clock input 404 with jitter above a predetermined threshold, reference clock generator 404 can be adjusted to reduce its associated clock frequency. Conversely, where jitter results and calculations output 410 reveals that the observed jitter is below a predetermined threshold, reference clock generator 404 can be adjusted to increase its associated clock frequency. Reference clock signal 412 generated by reference clock generator 404 has an associated duty cycle as known to one of skill in the art. Accordingly, jitter results and calculations output 410 can also be used to adjust the duty cycle of reference clock signal 412 to achieve improved performance.

Recall that delay elements 204-0 through 204-(n−1) and delay elements 310-0 through 310-(n−1) were preferably implemented such that the expected time of occurrence of a significant instant (i.e., the rising edge of a clock signal in this example) occurred centered about the delay elements 204-(n/2) and 310-(n/2), respectively. By having the expected time of occurrence of the significant instant centered along the delay elements, jitter that both lags and leads the expected time of occurrence of a significant instant can be properly observed and analyzed. Jitter measurement sub-system 402 can be configured to provide a median or average time of occurrence for observed significant events on an input clock signal 416. Such median or average time can be provided as part of jitter results and calculations output 410 which can then be fed back to programmable delay element 408. Accordingly, the associated delay of programmable delay element can be adjusted so that the median or average time of occurrence is made to be centered about a string of delay elements (i.e. delay element 204-(n/2) or 310-(n/2)). For example, where jitter measurement sub-system 402 determines that the average time of occurrence of a significant instant on input clock signal 416 occurs at 320 ps after the reference clock signal 412, the associated delay of programmable delay element 408 can be adjusted so that the delay elements 204-(n/2) or 310-(n/2) of FIG. 2B or 3A, respectively, are associated with an average delay of 320 ps.

Jitter measurement sub-system 402 can provide information about the deviation or distribution of significant instants on input clock signal 416. Such information can be in the form of the earliest and latest occurrences of significant instants on input clock signal 416. Moreover, analyzing circuit can be configured to provide statistical information such as a standard deviation. Such deviation or distribution information can be provided as part of jitter results and calculations 410 and then be fed back to delay elements 406. By feeding back such information, the associated delay of delay elements 406 can be adjusted for optimal performance. For example, where jitter measurement sub-system 402 determines that the deviation or distribution of significant instants on input clock signal 416 is spread out over a predetermined large number of delay elements 204-0 through 204-(n−1) or 310-0 through 310-(n−1), the associated delay of delay elements 204-0 through 204-(n−1) or 310-0 through 310-(n−1) can be increased. By increasing the associated delays, the deviation or distribution of significant instants on input clock signal 416 will be distributed over a smaller number of delay elements 204-0 through 204-(n−1) or 310-0 through 310-(n−1). Conversely, where jitter measurement sub-system 402 determines that the deviation or distribution of significant instants on input clock signal 416 is spread out over a predetermined small number of delay elements 204-0 through 204-(n−1) or 310-0 through 310-(n−1), the associated delay of delay elements 204-0 through 204-(n−1) or 310-0 through 310-(n−1) can be decreased. By decreasing the associated delays, the deviation or distribution of significant instants on input clock signal 416 will be distributed over a larger number of delay elements 204-0 through 204-(n−1) or 310-0 through 310-(n−1).

Significantly, jitter results and calculations output 410 produced by jitter measurement sub-system 402 can also be fed back to the circuits and sub-circuits 414 of feedback system 400. One of skill in the art appreciates the value of jitter results and calculations output 410 and can further use such information to optimize the operation of circuits and sub-circuits 414. For example, where circuits and sub-circuits 414 include filtering components, the characteristics of such filtering components can be adjusted responsive to jitter results and calculations output 410.

The foregoing descriptions of specific embodiments of the present invention have been presented for purposes of illustration and description. They are not intended to be exhaustive or to limit the invention to the precise forms disclosed. Many modifications and variations are possible in light of the above teachings without deviation from the scope of the claims set out below. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A circuit for jitter measurement, comprising:
    a plurality of delay elements arranged in a series-connected chain having a total delay equal to a sum of each delay of the delay elements, each delay element having an input and output, wherein the input of the first element in the chain receives an input clock signal, the chain propagating the input clock signal through each of its delay elements, and each delay element output producing a delayed version of the propagated input clock signal on its input;
    a first set of circuitry operative to produce at an output a pulse corresponding to each delay element in response to the propagation of a significant instant of the input clock signal through the delay element, each pulse having a width that is approximately equal to the delay of the corresponding delay element;
    a second set of circuitry having one storage element corresponding to each output of the first set of circuitry, and an input that receives a trigger signal that is timed to correspond to a delay that is approximately half of the total delay of the chain, and the second set of circuitry being operative to record in the corresponding storage elements one or more pulses that may be active at the time of occurrence of the trigger signal; and
    a single one detector operative to select one from the recorded pulses in the storage elements at the time of occurrence of the trigger signal, wherein a jitter measurement is made based on the selected pulses after a plurality of trigger signals has occurred.

2. The circuit of claim 1, wherein the output of one delay element is connected to the input of the next adjacent delay element.

3. The circuit of claim 1, wherein there is a number N of elements in the plurality of delay elements and N is an even number greater than 2 and implemented as a power of 2.

4. The circuit of claim 1, wherein the delay of each delay element is controlled by a delay control circuit.

5. The circuit of claim 4,
    wherein the delay of at least one of the plurality of delay elements is not equal to the delay of any other of the plurality of delay elements, and
    wherein the delay control circuit is a charge pump controlled delay lock loop.

6. The circuit of claim 1, wherein the first set of circuitry includes a plurality of two-input logic gates with each of the plurality of two-input logic gates corresponding to a respective one of the plurality of delay elements.

7. The circuit of claim 6, wherein each of the plurality of two-input logic gates is coupled to the input and the output of a corresponding one of the plurality of delay elements.

8. The circuit of claim 7, wherein one of the two inputs of each two-input logic gate is coupled to the output of its corresponding delay element via an inverter logic gate.

9. The circuit of claim 7, wherein one of the two inputs of each two-input logic gate is coupled to the output of its corresponding delay element by means of wired connection.

10. The circuit of claim 6, wherein each of the plurality of two-input logic gates is capable of producing a pulse with a width approximately equal to the delay of its corresponding delay element.

11. The circuit of claim 1, wherein the second set of circuitry includes a first plurality of latching circuits, each one of the first plurality of latching circuits corresponding to one of the plurality of delay elements.

12. The circuit of claim 1, wherein the input clock signal is related to a reference clock signal.

13. The circuit of claim 12, wherein the trigger signal is delayed by a first predetermined delay from the reference clock signal.

14. The circuit of claim 13, wherein a measure of jitter is determined by comparing a latched pulse to the first predetermined delay.

15. The circuit of claim 1, wherein pulses are recorded for a first number of significant instants of the trigger signal.

16. The circuit of claim 1, further comprising a third set of circuitry for recording pulses.

17. The circuit of claim 16, wherein the third set of circuitry includes a second plurality of latching circuits each, each one of the second plurality of latching circuits corresponding to one of the plurality of delay elements.

18. The circuit of claim 17, wherein each of the second plurality of latching circuits is provided with logic circuitry in a feedback loop for recording the presence of a desired input to the second plurality of latching circuits.

19. The circuit of claim 18, wherein the desired input to the second plurality of latching circuits is a logic level high.

20. The circuit of claim 1, further comprising a result calculator configured to provide information collected from the measure of jitter.

21. The circuit of claim 17, further comprising a result calculator connected to the second plurality of latching circuits and configured for receiving recorded pulses and based thereon providing information on an earliest occurrence in the chain of the significant instant of the propagating input clock signal.

22. The circuit of claim 17, further comprising a result calculator connected to the second plurality of latching circuits and configured for receiving recorded pulses and based thereon providing information on a latest occurrence in the chain of the significant instant of the propagating input clock signal.

23. The circuit of claim 17, further comprising a result calculator connected to the second plurality of latching circuits and configured for receiving recorded pulses and based thereon providing information on a difference between an earliest and a latest occurrence in the chain of the significant instant of the propagating input clock signal.

24. The circuit of claim 17, further comprising a result calculator connected to the second plurality of latching circuits and configured for receiving recorded pulses and based thereon providing median or average information on the occurrences of the significant instant of the input clock signal.

25. The circuit of claim 17, further comprising a result calculator connected to the second plurality of latching circuits and configured for receiving recorded pulses and based thereon providing information on a standard deviation in the occurrences of the significant instant of the input clock signal.

26. The circuit of claim 20, wherein the result calculator is configured to provide information responsive to a mode selection signal.

27. A method for measuring jitter of a clock signal, comprising:
for each of a plurality of trigger signal occurrences, performing the steps of:
receiving the clock signal, the clock signal having a significant instant;
propagating the significant instant of the clock signal through a chain of delay elements, wherein each element of the chain has an associated delay and the chain has a total delay equal to the sum of the associated delays;
receiving a trigger signal and delaying the received trigger signal so as to occur at a time equal to approximately half the total delay of the chain;
detecting the propagation of the significant instant of the clock signal through each of the delay elements in the chain and producing a pulse corresponding to each of the delay elements;
if multiple pulses are produced coincident with the trigger signal, filtering the multiple pulses to provide one filtered pulse coincident with the trigger signal; and
recording the filtered pulse that is coincident with the trigger signal; and
producing a jitter measurement signal responsive to a plurality of filtered pulses after the plurality of trigger signal occurrences.

28. The method of claim 27, further comprising deriving a jitter measure through a comparison of the jitter measurement signal to an associated delay.

29. The method of claim 27, wherein the filtered pulse contains information of an earliest occurrence in the chain of the propagating significant instant of the input clock signal.

30. The method of claim 27, wherein the filtered pulse contains information of a latest occurrence in the chain of the propagating significant instant of the input clock signal.

31. The method of claim 27, wherein the filtering step further comprises determining an earliest occurrence in the chain of the propagating significant instant.

32. The method of claim 27, wherein the filtering step further comprises determining a latest occurrence in the chain of the propagating significant instant.

33. The method of claim 27, wherein the filtering step further comprises determining a difference between an earliest and a latest occurrence in the chain of the propagating significant instant.

34. The method of claim 27, further comprising determining statistical information on the occurrences in the chain of the propagating significant instant.

35. The method of claim 27, wherein an associated frequency of the clock signal is adjusted in response to the jitter measurement signal.

36. The method of claim 27, wherein the trigger delay is adjusted in response to the jitter measurement signal.

37. The method of claim 27, further comprising receiving a reset signal, wherein the reset signal is delayed by a second delay relative to the reference clock signal which is adjusted in accordance with the jitter measurement signal.

38. The method of claim 27, further comprising inputting the reference clock signal to a circuit to produce the input clock signal.

39. The method of claim 38, wherein the circuit is adjusted in accordance with the jitter measurement signal.

40. A system for responding to jitter therein, comprising:
a reference clock configured to generate a reference clock signal having an associated frequency;
a plurality of circuits configured to receive the reference clock signal and operative to generate an input clock signal, the plurality of circuits having a first set of characteristics; and
a jitter measurement sub-system configured to receive the reference clock signal and the input clock signal and operative to generate a jitter measurement output signal responsive to a significant instant of the input clock signal, wherein the jitter measurement sub-system includes:
- a plurality of delay elements having a plurality of associated delays configured to generate a synthesized signal from the reference clock signal and the input clock signal; and
- at least one programmable delay element having at least one associated programmable delay configured to produce a trigger signal for generating the jitter measurement output signal from the synthesized signal;

wherein the system is operative to adjust at least one parameter of the system in accordance with the jitter measurement output signal.

41. The system of claim 40, wherein the at least one parameter of the system is at least one parameter of the jitter measurement sub-system.

42. The system of claim 40, wherein the at least one parameter includes the associated frequency.

43. The system of claim 40, wherein the reference clock signal further has an associated duty cycle, and the at least one parameter includes the associated duty cycle.

44. The system of claim 40, wherein the at least one parameter includes at least one characteristic from the first set of characteristics.

45. The system of claim 40, wherein the plurality of circuits includes a plurality of sub-circuits having a second set of characteristics, and wherein the at least one parameter includes at least one characteristic from the second set of characteristics.

46. The system of claim 40, wherein the output of one of the plurality of delay elements is connected to the input of a next adjacent one of the plurality of delay elements.

47. The system of claim 40, wherein at least one of the plurality of associated delays is not equal to any other of the plurality of associated delays.

48. The system of claim 40, wherein the at least one parameter includes at least one of the plurality of associated delays.

49. The system of claim 40, wherein the at least one parameter includes all of the plurality of associated delays.

50. The system of claim 40, wherein the at least one parameter includes the at least one associated programmable delay.

51. A jitter measurement circuit comprising:
- a plurality of delay elements arranged in a series-connected chain having a total delay equal to a sum of each delay of the delay elements, each having an input and an output, wherein the input of the first element in the chain receives an input clock signal, the chain propagating the input clock signal through each of its delay elements, and each delay element output producing a delayed version of the propagated input clock signal on its input;
- a first set of circuitry operative to produce at an output a pulse corresponding to each delay element in response to the propagation of a significant instant of the input clock signal through the delay element, each pulse having a width that is approximately equal to the delay of the corresponding delay element; and
- a second set of circuitry having one storage element corresponding to each output of the first set of circuitry, and an input that receives a trigger signal that is timed to correspond to a delay that is approximately half of the total delay of the chain, and the second set of circuitry being operative to record in each corresponding storage element any pulse that is active at the time of occurrence of the trigger signal;
- a single one detector operative to select one from the recorded pulses in the storage elements at the time of occurrence of the trigger signal;
- multiple event recorder circuitry operative to capture the selected one of the recorded pulses in the single one detector upon occurrence of each of a plurality of trigger signals, wherein a jitter measurement is made based upon the captured selected pulses; and
- a result calculator for producing statistical information about occurrences in the chain of the significant instance of the input clock signal.

* * * * *